United States Patent [19]
Denny et al.

[11] Patent Number: 5,633,628
[45] Date of Patent: May 27, 1997

[54] WHEELSET MONITORING SYSTEM

[75] Inventors: Joseph M. Denny, Fairport; David W. Marcellus, Rochester, both of N.Y.; Gordon F. Quigley, North Andover, Mass.

[73] Assignee: General Railway Signal Corporation, Rochester, N.Y.

[21] Appl. No.: 582,535

[22] Filed: Jan. 3, 1996

[51] Int. Cl.$^6$ ............................................. G08B 21/00
[52] U.S. Cl. ...................... 340/584; 340/449; 340/589; 340/682
[58] Field of Search .................... 340/584, 589, 340/682, 449

[56] References Cited

U.S. PATENT DOCUMENTS

| | | | |
|---|---|---|---|
| 3,548,396 | 12/1970 | Roberts | 340/682 |
| 4,812,826 | 3/1989 | Kaufmann et al. | 340/682 |
| 4,977,577 | 12/1990 | Arthur et al. | 375/1 |
| 5,381,692 | 1/1995 | Winslow et al. | 340/682 |
| 5,438,322 | 8/1995 | Martin et al. | 340/584 |

*Primary Examiner*—Glen Swann
*Attorney, Agent, or Firm*—Ohlandt, Greeley, Ruggiero & Perle

[57] ABSTRACT

A thermal warning device attaches to a wheel assembly of a railway car to detect whether the wheel assembly has reached high temperatures and may lead to a potential bearing failure. A temperature sensor for monitoring the temperature of the wheel assembly is coupled to an electronic circuit for determining whether a bearing failure may occur based on the temperatures detected by the temperature sensor. In particular, the temperature sensor adjustably extends into the wheel assembly in order to obtain accurate readings of high temperatures in wheel assembly. Also, the electronic circuit is situated away from the outer surface of the wheel assembly so that the electronic circuit will not be subjected to heat from the wheel assembly and may freely dissipate heat produced by its own components. Upon determination of a warning condition, the electronic circuit transmits a warning signal to a wayside station or train crew. Optionally, the electronic circuit may include a wireless transmitter for communication with an in-cab receiver.

26 Claims, 6 Drawing Sheets

WHEELSET MONITORING SYSTEM

BACKGROUND OF THE INVENTION

1. Field of the Invention

The present invention relates generally to thermal detection systems that detect the failure of mechanical devices when a predetermined temperature has been reached. More particularly, the present invention relates to thermal warning device in a wheel assembly of a railway car to indicate when the temperature of the wheel assembly has reached a level indicative of potential bearing failure.

2. Description of the Prior Art

Various warning devices are used to detect impending trouble in a wheel assembly of a railway car before the actual occurrence of a bearing failure. One indicator of possible bearing failure is the detection of excessively high temperatures in the wheel assembly. In particular, overheating of the wheel assembly may lead to an undesirable incident, such as a train derailment. To forestall such an event, a thermal warning device may be positioned in a wheel assembly to indicate a possible bearing failure when the wheel assembly has exceeded a predetermined threshold temperature.

It is known that thermal warning devices in the form of specially adapted bolts may be substituted for standard bolts that are normally secured to the wheel assembly. These specially adapted bolts or thermal warning bolts determine when a railway car bearing has reached a predetermined threshold temperature, and, as a consequence, provide a warning signal to a wayside station or train crew in time to prevent potential problems. For example, U.S. Pat. No. 4,812,826 to Kaufman et at, which issued on Mar. 14, 1989, provides a thermal warning bolt having the dimensions of a standard bolt and includes a communication circuit for producing a radio frequency signal that provides a warning signal. Responsive to the rise in temperature in the wheel assembly, an antenna, which is positioned axially in the bolt, extends through the head of the bolt. The movement of the antenna triggers the communication circuit to emit the radio frequency signal and, thus, alert a train crew of a possible problem with the wheel assembly.

One problem with implementing a communication circuit in a standard bolt is the sensitivity of its electronic components to heat. The temperature of the wheel assembly can reach levels as high as 250 degrees to 350 degrees Celsius. In order to function properly and reliably, such electronic components require a way to dissipate heat and avoid high temperature levels. Accordingly, high temperatures produced by bearing assemblies may cause communication circuits of thermal warning bolts to malfunction.

Another problem is the mechanical degradation of the bolt due to hollowing the bolt to accommodate the communication circuit. An additional problem is the such bolt may be used only once since the communication circuit in the bolt only transmits when a predetermined threshold temperature is breached. Due to its one shot nature, there is no way to self-test the communication circuit to determine whether it is functional.

In view of the above problem, thermal warning devices have been designed to minimize the adverse effects caused to the thermal sensors' electronic components by exposure to high temperatures. For example, U.S. Pat. No. 5,438,322 to J. M. Martin, et al., which issued on Aug. 1, 1995, provides a thermal warning bolt having a communication circuit positioned in the head of a bolt and a temperature sensor situated at the opposite end of the bolt. The communication circuit is positioned away from high temperatures while the temperature sensor is situated near the wheel assembly. Similar to U.S. Pat. No. 4,812,826 cited above, this thermal warning bolt suffers from the problems of mechanical degradation of the bolt and one shot operation which prohibits self-testing.

In addition, U.S. patent application Ser. No. 08/276,845 to J. M. Denny, et at., which was filed on Jul. 18, 1994 now abandoned, provides a thermal warning device having a temperature sensor situated in a bolt whereas a communication circuit coupled to the temperature sensor is positioned outside of the bolt. In particular, the communication circuit is enclosed in a housing that is situated adjacent to the wheel assembly. The communication circuit of the thermal warning device is positioned away from high temperatures generated by the wheel assembly while the temperature sensor is situated near the wheel assembly for accurate detection of high temperatures. However, similar to U.S. Pat. Nos. 4,812, 826 and 5,438,322 cited above, this thermal warning device has the problem of mechanical degradation of the bolt.

Thermal warning devices that provide reliable detection of high temperatures are typically expensive and require extensive assembly and installation. In order to obtain an accurate high temperature reading of a wheel assembly, the temperature sensor of the thermal warning device should, preferably, extend deep into the wheel assembly. Unfortunately, the distance that a temperature sensor may extend into the wheel assembly varies with the type and configuration of the wheel assembly. Since existing thermal warning devices have temperature sensors with fixed lengths, it is costly for one to stock a variety of thermal warning devices, each having a different temperature sensor length. In addition, since existing thermal warning devices employ temperature sensors embedded in one of three wheel assembly retaining bolts, the bolt strength is degraded by the creation of a bore through the bolt. Additionally, bearings from different manufacturers operate at vastly different temperatures and precludes the use of a fixed threshold temperatures sensor. Further, a thermal warning device having a communication circuit that is positioned away from the wheel assembly tends to be expensive to manufacture and install.

Against the foregoing background, it is a primary object of the present invention to provide a thermal warning device having its electronic components positioned away from high temperatures of a wheel assembly in order to minimize the adverse effects caused by exposure to such high temperatures.

It is another object of the present invention to provide such a thermal warning device in which the body of the thermal warning device may be inserted into a threaded hole created on one side of the wheel assembly without mechanical degradation of the wheel assembly.

It is further object of the present invention to provide such a thermal warning device which includes a temperature sensor that extends deep into the areas near wheel assembly in order to obtain accurate readings of high temperatures in wheel assembly.

It is a still further object of the present invention to provide such a thermal warning device in which the temperature sensor is variable in length to adjust to the inner portion of the wheel assembly.

It is still another object of the present invention to provide such a thermal warning device in which the electronic components of the thermal warning device are situated a particular distance away from the outer surface of the wheel assembly.

It is a still further object of the present invention to eliminate the need for drilling a bore into a support bolt of the wheel assembly.

It is a still further object of the present invention to eliminate the requirement of wheel shops or disassembly of the wheel assembly to replace old or damaged communication circuits.

It is a further object of the present invention optionally to include a radio transmitter, such as a spread spectrum transmitter, as means for communicating wireless signals from a variety of warning devices to respective receivers.

It is a yet another object of the present invention to provide such a thermal warning device that is inexpensive and simple to manufacture and install.

It is a still another object of the present invention to provide such a thermal warning device that has customized threshold temperature levels for different wheel assembly types and self-test diagnostic capability.

SUMMARY OF THE INVENTION

To accomplish the foregoing objects and advantages, the primary feature of the present invention, in brief summary, is a thermal warning device for detection of a potential bearing failure in a wheel assembly which comprises a housing having a first insert portion for insertion into the wheel assembly. The first insert portion includes a bore, which extends through the first insert portion, having a distal end. In addition, a temperature sensor, responsive to an elevated temperature indicative of the potential bearing failure, is adjustably positioned through the distal end of the bore such that at least a portion of the temperature sensor is external to the bore. Accordingly, the temperature sensor adjustably slides through the distal end of the bore to adjust to inner dimensions of the wheel assembly as the first insert portion is inserted into the wheel assembly.

More specifically, the primary feature of the present invention is a thermal warning device for detection of a potential bearing failure in a wheel assembly which comprises a housing having a first insert portion for insertion into the wheel assembly. The first insertion portion includes a bore, which extends through the first insert portion, having a first end and a second end. In addition, a temperature sensor, responsive to an elevated temperature indicative of the potential bearing failure, having a base at one end and a tip at an opposite end, is adjustably positioned through the first end of the bore such that the base is within the bore whereas the tip is external to the bore. Accordingly, the temperature sensor adjustably slides through the first end of the bore to adjust to inner dimensions of the wheel assembly as the first insert portion is inserted into the wheel assembly.

Further, the present invention is a thermal warning device for detection of a potential bearing failure in a wheel assembly which comprises a housing having a first insert portion, a second separating portion and a third circuit portion. The second separating portion of the housing has a shoulder positioned adjacent to the wheel assembly and a connecting section distal from the shoulder. The third circuit portion of the housing is integrally attached to the connecting section of the second separating portion, the third circuit portion having a planar surface directed toward the wheel assembly that is distal from the wheel assembly at a predetermined distance. In addition, an electronic circuit located in the third circuit portion determines whether the potential bearing failure may occur. Thus, the second separating portion of the housing separates the third circuit portion of the housing from the wheel assembly so that a substantial gap of thermal insulation is created between the electronic circuit and the wheel assembly.

Another aspect of the present invention resides in the inclusion of a wireless transmitter for communication of wireless signals from a variety of warning devices to respective receivers.

BRIEF DESCRIPTION OF THE DRAWINGS

The foregoing and still further the objects and advantages of the present invention will be more apparent from the following detailed explanation of the preferred embodiments of the invention in connection with the accompanying drawings.

DETAILED DESCRIPTION OF THE PREFERRED EMBODIMENT

Figure 1:
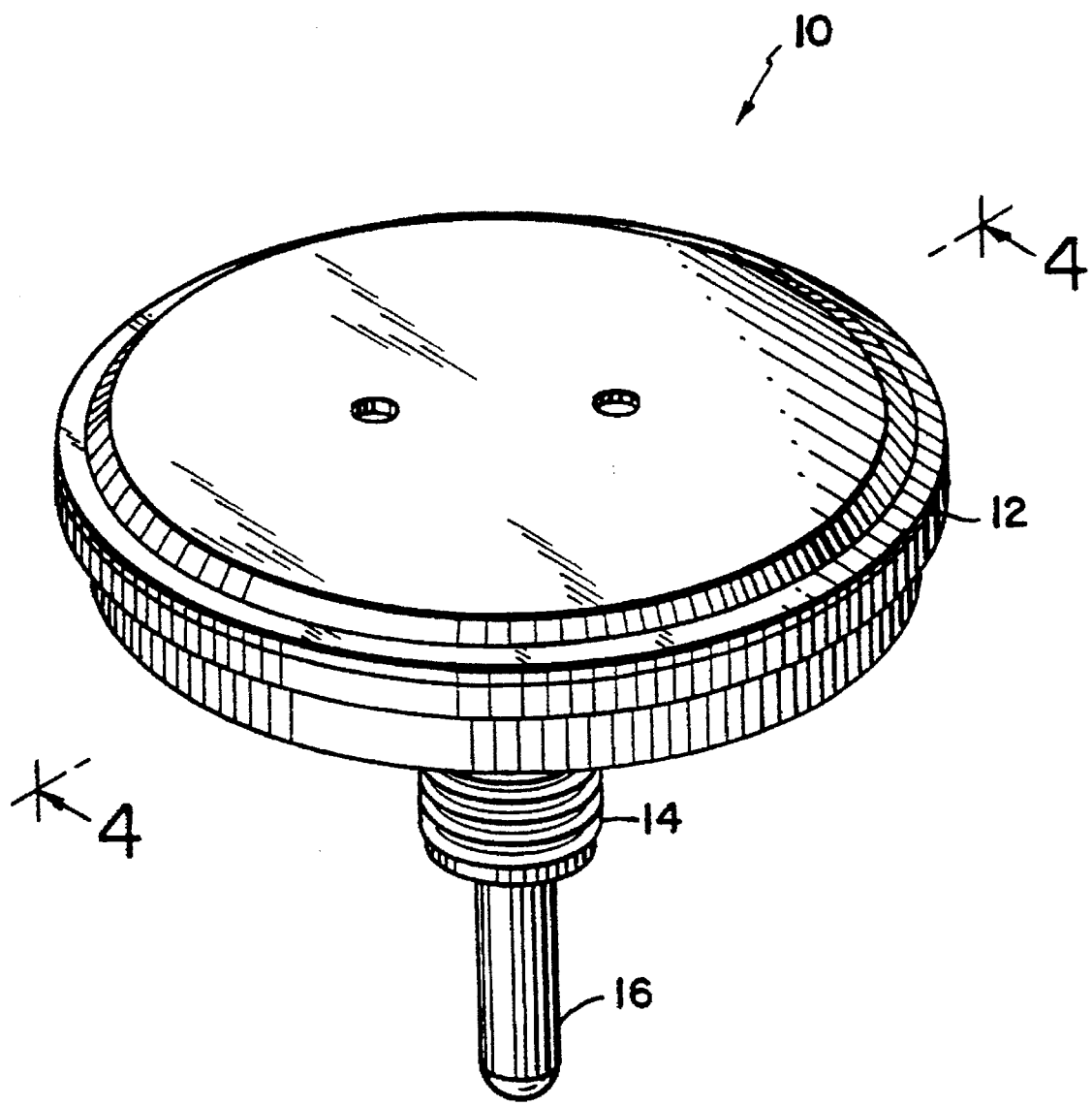
FIG. 1 is a perspective view of a preferred embodiment of the present invention.

Referring to the drawings and, in particular, to FIG. 1, there is provided a thermal warning device of the preferred embodiment which is generally represented by reference numeral 10. The thermal warning device 10 is designed to monitor the conditions of bearing assemblies of railway car wheels. One or more of the devices 10 may be placed in a single wheel assembly, including a bearing assembly and axle, and extend into the axle of the wheel assembly. For example, the device 10 may be positioned in a wheel assembly by creating a threaded hole on one side of the wheel assembly and screw mounting the device into the threaded hole.

As shown in FIG. 1, the preferred embodiment of the thermal warning device 10 is a one piece, modular unit comprising a housing 12 having a threaded lower portion 14 and a temperature sensor 16 extending from the lower portion. The default position of the temperature sensor 16 is to be fully extended from the lower portion 14 of the housing 12 as shown in FIG. 1. As the device 10 is screw mounted into the wheel assembly, the temperature sensor 16 will remain fully extended until obstructed by a wall or structure in the wheel assembly. Thus, the distance that the temperature sensor 16 extends from the lower portion 14 of the housing 12 is adjustable based on the amount of space available in the wheel assembly. Accordingly, the device 10 is designed to accommodate all sizes and types of wheels for installation and be easily replaced for maintenance purposes.

Figure 2:
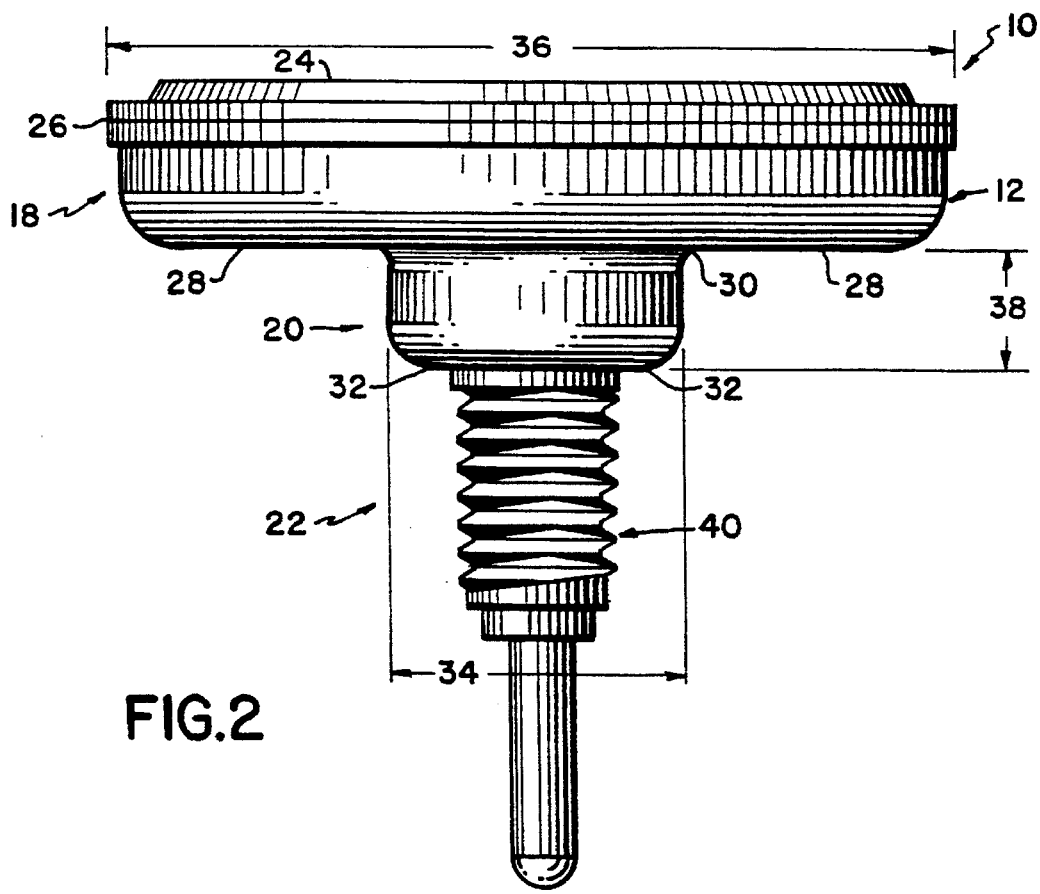
FIG. 2 is a side elevational view of the preferred embodiment of FIG. 1.

Referring to FIG. 2, the housing 12 of the thermal warning device 10 includes three generally cylindrical portions: an upper circuit portion 18, a intermediate separating portion 20 and a lower insert portion 22. The upper circuit portion 18 has a cap 24 that covers the inner components of the device 10. Although the cap 24 may be removable for easy inspection and access by maintenance personnel, it is preferred that an ultrasonic weld 26 secures the cap 24 to the rest of the housing 12 to provide a hermetic seal, strong tensile strength and high impact resistance. Also, the circuit portion 18 has a lower, planar surface 28 located on the side opposite the removable cap 24 of the circuit portion.

The intermediate separating portion 20 has a connecting section 30 that is integrally and centrally attached to the lower, planar surface 28 of the upper circuit portion 18. The separating portion 20 also has a shoulder 32 at its lower side that is positioned adjacent to the outer surface of the wheel assembly when the device 10 is positioned therein. Also, the sectional diameter 34 of the separating portion 20 is substantially smaller than the sectional diameter 36 of the upper circuit portion 18, and the axial thickness 38 of the separating portion is such that the connecting section 30 is distal from the shoulder 32. Therefore, when the device 10 is positioned in the wheel assembly, a layer of air exists beneath the lower, planar surface 28 of the circuit portion 18, thereby creating a substantial gap of thermal insulation between the circuit portion and the wheel assembly. A potting compound may be positioned beneath the lower, planar surface 28.

When the device 10 is in position for use, the lower insert portion 22 of the housing 12 is inserted into the wheel assembly whereas the circuit portion 18 and the separating portion 20 remain on the outside of the wheel assembly. As shown in FIG. 2, the insert portion 22 has a threaded outer surface 40 for screw mounting in the wheel assembly. In effect, the combination of the insert portion 22 with the separating portion 20 includes dimensions that are similar to that of a standard bolt.

Figure 3:
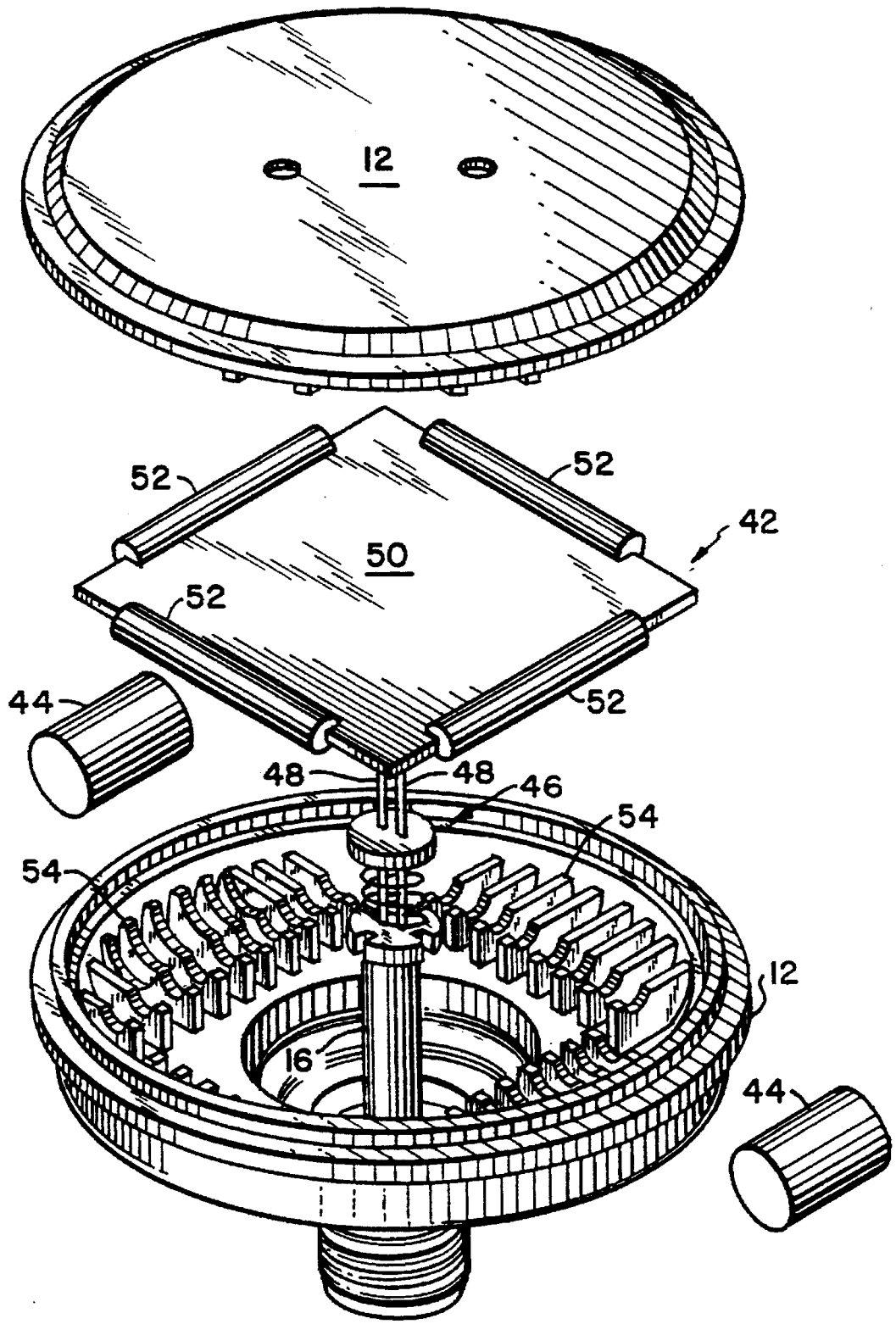
FIG. 3 is an exploded view of the preferred embodiment of FIG. 1.

Referring to FIG. 3, the inner compartment of the housing 12 supports an electronic circuit 42, a power supply 44 and a probe assembly 46. In addition, a pair of insulated lines 48 couples the temperature sensor 16 of the probe assembly 46 with the electronic circuit 42. For the preferred embodiment, the electronic circuit 42 includes a circuit board 50 having a support strip 52 at each of its four sides to secure the circuit board in the housing 12 and protect the circuit board from erratic movements subjected to the device 10 by its hazardous environment. A silicon potting compound may be used in place of the support strip 52. Also, the power supply 44 for the preferred embodiment is a pair of batteries, such Lithium cell batteries.

Figure 4:
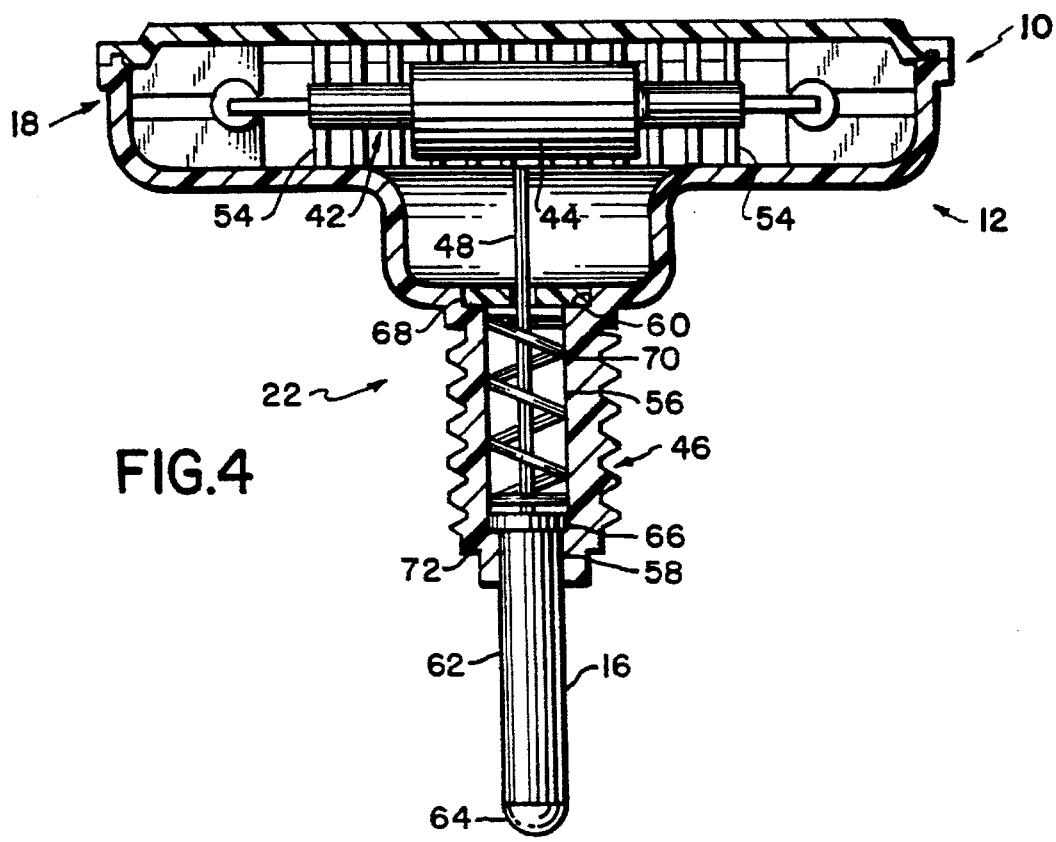
FIG. 4 is a sectional view along line 4—4 of the preferred embodiment of FIG. 1.

Referring to FIG. 4, the various components of the device 10 are supported by the housing 12 such that the electronic circuit 42 and the power supply 44 are positioned at the upper most position and the temperature sensor 16 is positioned at the lower most position. The electronic circuit 42 and the power supply 44 are supported in the circuit portion 18 of the housing 12 by a plurality of support railings 54 extending from the inner walls of the circuit portion 18 to provide mechanical strength.

As shown in FIG. 4, the probe assembly 46 of the device 10 is supported within a bore 56 extending through the insert portion 22 of the housing 12. The bore 56 is substantially even throughout its entire length except for its ends. A distal end 58 of the bore 56 has a narrower cross-section than the rest of the bore, and a non-distal end 60 of the bore has a wider cross-section that the rest of the bore.

The probe assembly 46 includes the temperature sensor 16 which, as described above, is coupled to the electronic circuit 42 by the pair of insulated lines 48, one of which is shown in FIG. 4). The body 62 of the temperature sensor 16 is substantially cylindrical in shape. The temperature sensor 16 has a half-spherical tip 64 at one end and a base 66 having an enlarged diameter at the other end. Thus, the temperature sensor 16 is designed for sliding movement through the distal end 58 of the bore 56 such that the base 66 of the temperature sensor 16 is supported by the inner wall of the bore and the body 62 of the temperature sensor is supported by the distal end.

A plug 68 is positioned in the non-distal end 60 of the bore 56 to seal the bore from the remainder of the inner compartment of the housing 12 with the exception of the pair of insulated lines 48. In addition, a spring mechanism 70 is positioned between the plug 68 and the base 66 of the temperature sensor 16. As shown in FIG. 4, the plug 68 permits the pair of insulated lines 48 to pass through so that the lines couple the temperature sensor 16 to the electronic circuit 42. For the preferred embodiment, the plug 68 is secured by an ultrasonic weld that provides a hermetic seal. The plug 68 must be strong enough to resist the spring force of the spring mechanism 70. Accordingly, the ultrasonic weld of the preferred embodiment is strong enough to resist a spring force of about 150 lbs.

Accordingly, the temperature sensor 16 moves axially through the distal end 58 of the bore 56. The movement of the base 66 of the temperature sensor 16 is restricted to the area between the distal end 58 and non-distal end 60 of the bore 56. At its default position shown in FIG. 4, the base 66 of the temperature sensor 16 is held against an abutting shoulder 72 at the distal end 58 by an axial force exerted by the spring mechanism 70. As the device 10 is inserted into the wheel assembly, an inner portion of the wheel assembly may contact the tip 64 of the temperature sensor 16 and force the temperature sensor against the spring mechanism 70. Thus, if the inner portion of the wheel assembly cannot accommodate the full length of the temperature sensor 16, the temperature sensor will adjust to the appropriate length. With the spring-loaded temperature sensor 16, the device 10 fits all wheel assembly sizes, including 50 ton, 75 ton, 100 ton and 125 ton bearing assemblies. Accordingly, the temperature sensor 16 reads axle temperature and adjusts to the varying sizes of wheel assemblies, in general, including the bearing assembly and axle sizes.

Figure 5:
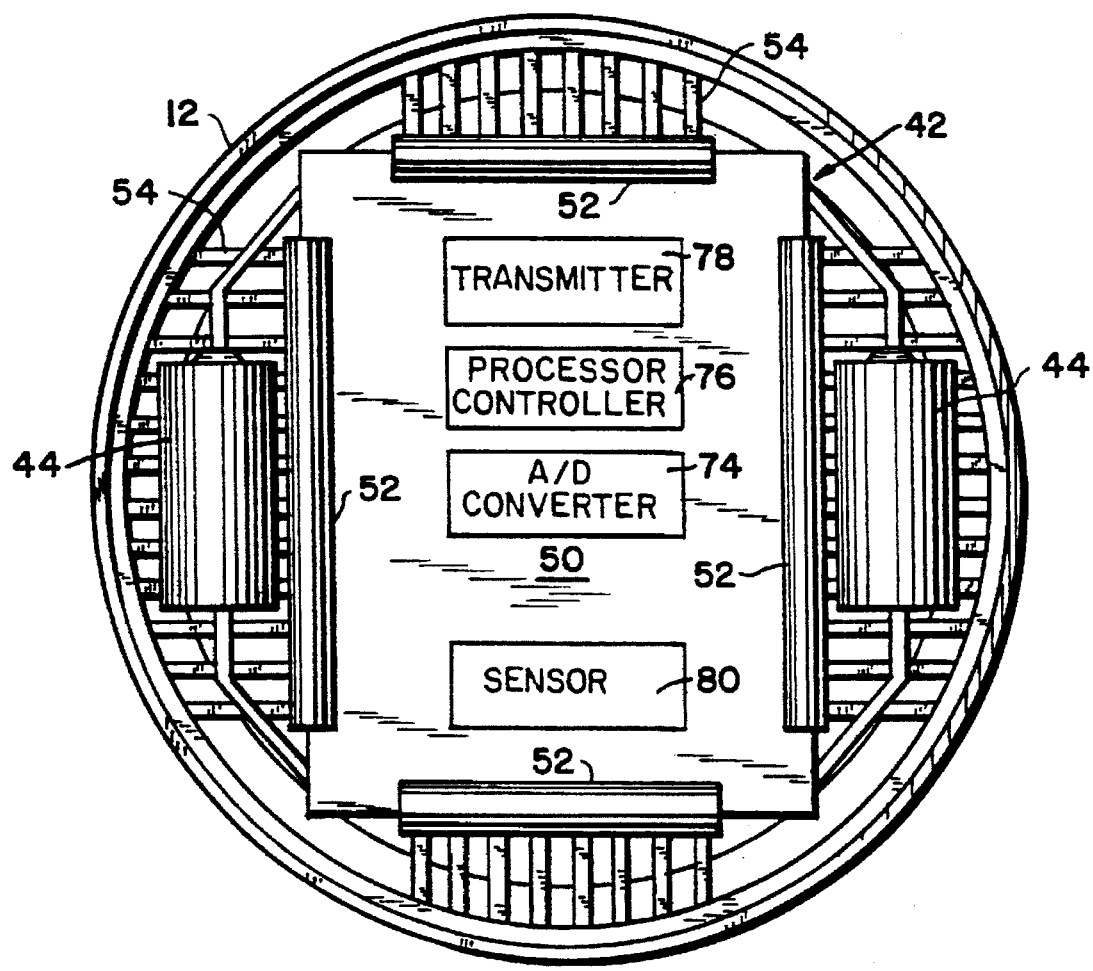
FIG. 5 is another top view of the body of the preferred embodiment FIG. 4 in which the electronic circuit and batteries are positioned in the body.

Referring to FIG. 5, the electronic circuit 42 of the preferred embodiment includes a circuit board 50 and a power supply 44 interconnected to the circuit board. The circuit board 50 may provide the device 10 with a wide variety of functions. For example, the elements of the circuit board 50 may measure the effects of temperature, vibration and acceleration that have been detected by the device 10. Also, the device 10 may determine whether the wheelset becomes loose, determine whether communication circuitry is operating properly and continuously, perform periodic monitoring and self tests, control monitor rate in order to extend battery life, compare ambient temperature against measured temperature and produce rate of rise comparisons, and determine whether the temperature sensor 16 is properly positioned in the center of the wheel assembly.

Figure 6:
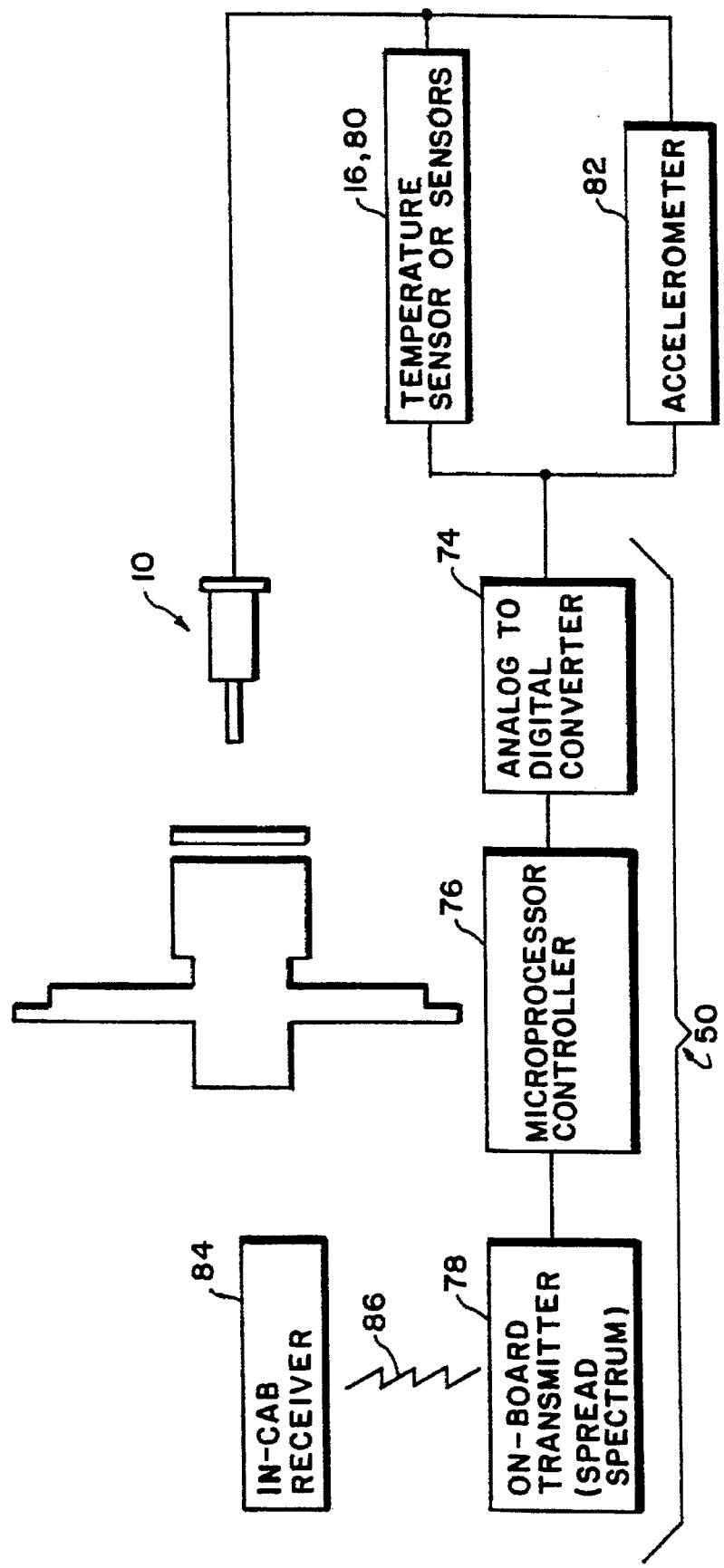
FIG. 6 is a diagrammatic view of the electronic components of the preferred embodiment of FIG. 1.

Referring to FIGS. 5 and 6, the circuit board 50 of the preferred embodiment includes a analog-to-digital converter 74, a microprocessor controller 76, an on-board wireless transmitter 78 and a on-board temperature sensor 80. Although not shown in FIG. 5, the electronic circuit 50 may also include an antenna 86, such as a wire helix, that is soldered to the on-board transmitter 78. During operation, the analog-to-digital converter 74 would receive data readings, such as bearing temperature readings from the temperature sensor 16 or acceleration readings from an accelerometer 82, and convert them to digital form for processing by the microprocessor controller 76. The microprocessor controller 76 then determines whether potential bearing failure may occur in the wheel assembly. If potential bearing failure may occur, the microprocessor controller 76 will instruct the on-board transmitter 78 to send a warning signal to receivers 84 located within the transmitting range of the on-board transmitter. Such receivers may be located on-board a railway train cab or at a wayside station.

The analog-to-digital converter 74 may also receive ambient temperature readings from the on-board temperature sensor 80. In such case, the microprocessor controller 76 may perform a rate of rise comparison to track the rate of temperature change of the bearing temperature readings. An important feature of the present invention is that the electronic circuit 50 is always active as it monitors all conditions surrounding the device 10 and all internal conditions of the device, analyzes such conditions and transmits the results of its analysis to a receiver 84 within transmitting range.

As noted previously, the wireless transmitter 78 communicates with the in-cab receiver 84 or the like. Preferably, the transmitter would be a spread spectrum transmitter utilized to exploit its known advantages of relative freedom from interference by other transmitters, and its ability to transmit discrete address components as part of the modulated signal, whereby independent faults at particular locations can be individually identified and displayed by utilizing separate transmitters at the respective locations which communicate with corresponding receivers.

The wireless transmitter would preferably be a spread spectrum transmitter, for example, as disclosed in U.S. Pat. No. 4,977,577, which issued on Dec. 11, 1990, entitled WIRELESS ALARM SYSTEM. The disclosure of that transmitter of U.S. Pat. No. 4,977,577 is incorporated herein by reference, particularly as to its address means, functioning to provide a unique address for selective reception by a corresponding receiver.

Figure 7:
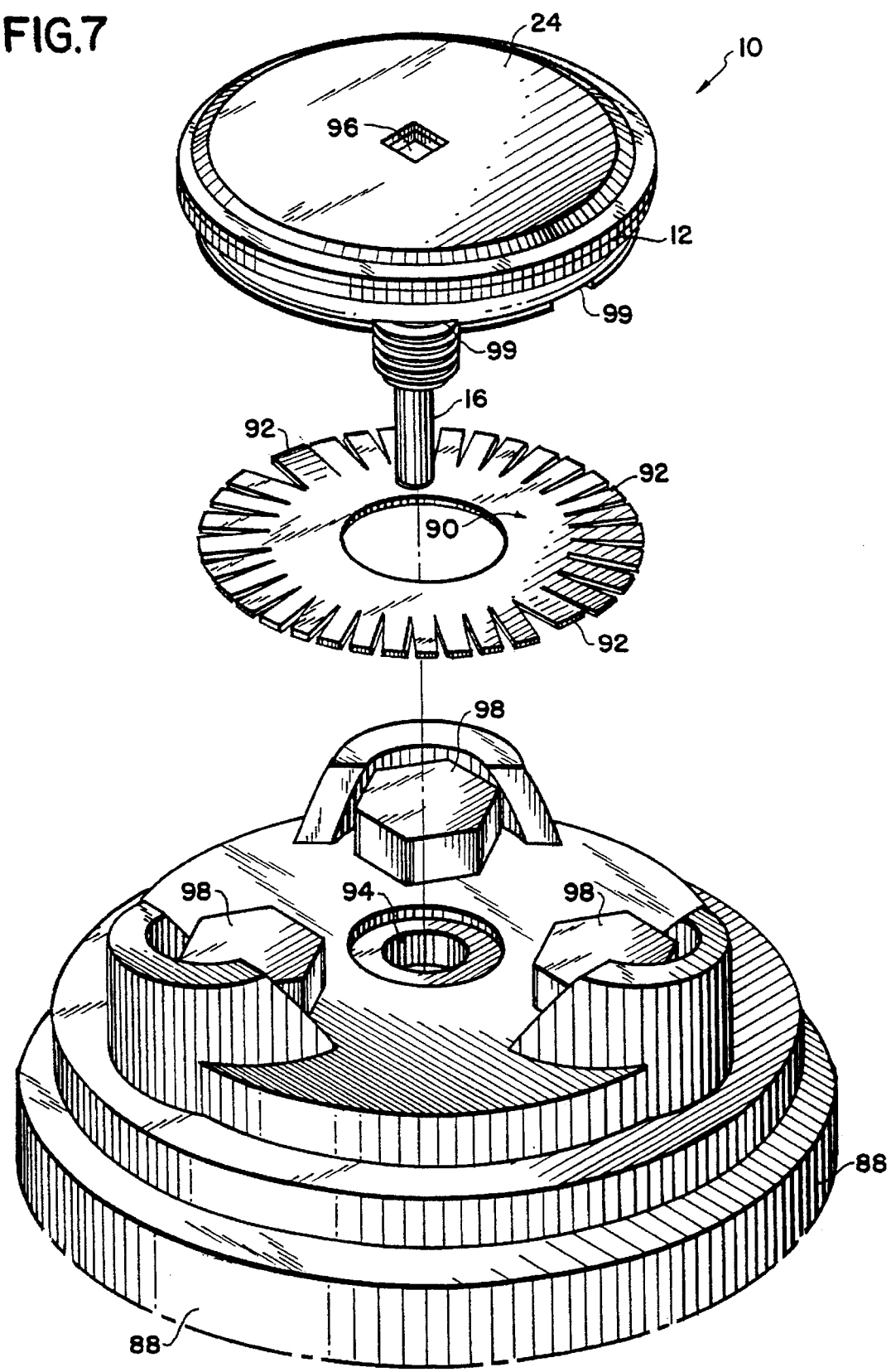
FIG. 7 is a perspective of the preferred embodiment of FIG. 1, a locking plate and a wheel assembly.

Referring to FIG. 7, the preferred device 10 is supported against the outer surface of the wheel assembly 88 by a locking plate 90. The locking plate 90 includes a plurality of prongs or tines 92 that may bend inward toward the device 10 or outward toward the wheel assembly 88. The device 10 is positioned against the outer surface of the wheel assembly 88 with its temperature probe 16 extending into a receiving hole 94 of the wheel assembly. Also, the locking plate 90 positioned between the device 10 and the outer surface of the wheel assembly 88. The device 10 may be mounted into the receiving hole 94 by grabbing the outer circumference of the housing 12 is a tie wrap or engaging a central aperture 96 of the cap 24 with a standard socket wrench. To secure the device 10 to the locking plate 90, several of the tines 92 are bent inward into grooved portions 99 at the lower, planar surface 28 of the housing 12. Although grooved portions 98 are not shown in FIGS. 1 through 4, it is to be understood that such grooves may be molded or otherwise formed at the lower, planar surface 28 of the housing 12. Similarly, to secure the locking plate 90 to the wheel assembly 88, other tines 92 are bent outward around support bolts 98 at the outer surface of the wheel assembly. In particular, tines 92 are positioned on both sides of each support bolt 98 to prevent the locking plate 90 from rotating. Accordingly, the device 10 may be rotated only when the tines 92 have be bent back to their original positions away from the support bolts 98.

The invention having been thus described with particular reference to the preferred forms thereof, it will be obvious that various changes and modifications may be made therein without departing from the spirit and scope of the invention as defined in the appended claims.

Wherefore, we claim:

1. A thermal warning device for detection of a potential bearing failure in a wheel assembly comprising:

a housing having an insert portion for insertion into the wheel assembly;

a bore extending through said insert portion, said bore having a distal end; and a temperature sensor, responsive to an elevated temperature indicative of the potential bearing failure, said temperature sensor being adjustably positioned through said distal end of said bore such that at least a portion of said temperature sensor is external to said bore;

wherein said temperature sensor adjustably slides through said distal end of said bore to adjust to inner dimensions of the wheel assembly as said insert portion is inserted into the wheel assembly.

2. The thermal warning device of claim 1, wherein said insert portion has a threaded outer surface for screw mounting in the wheel assembly.

3. The thermal warning device of claim 1, wherein said temperature sensor includes a base at an end portion of said temperature sensor.

4. The thermal warning device of claim 3, further comprising a distal shoulder at said distal end of said bore for preventing said base of said temperature sensor from passing through said distal end.

5. The thermal warning device of claim 3, further comprising a plug positioned at a non-distal end of said bore for preventing said base of said temperature sensor from passing through said non-distal end.

6. The thermal warning device of claim 1, further comprising a spring positioned in said bore for applying an outward axial force to said temperature probe and countering an inward axial force from said temperature probe.

7. The thermal warning device of claim 1, further comprising an electronic circuit positioned in said housing and coupled to said temperature probe, said electronic circuit including a controller for determining whether the potential bearing failure may occur.

8. The thermal warning device of claim 7, wherein said electronic circuit includes an antenna and a transmitter for transmitting a warning signal to receivers located within a particular transmitting range.

9. The thermal warning device of claim 1, wherein:

said temperature sensor detects temperature readings corresponding to temperatures in the wheel assembly;

said housing includes a second temperature sensor for detecting second temperature readings corresponding to temperatures outside of the wheel assembly; and said housing includes an electronic circuit coupled to said temperature sensor and said second temperature sensor for determining a rate of temperature change of said temperature reading based on said second temperature reading.

10. The thermal warning device of claim 9, wherein said second temperature sensor is located on said electronic circuit.

11. The thermal warning device of claim 1, further comprising an electronic circuit positioned in said housing, said electronic circuit including a spread spectrum transmitter for transmitting a modulated signal having discrete address components.

12. A thermal warning device for detection of a potential bearing failure in a wheel assembly comprising:

a housing having an insert portion for insertion into the wheel assembly;

a bore extending through said insert portion, said bore having a first end and a second end; and a temperature sensor, responsive to an elevated temperature indicative of the potential bearing failure, having a base at one end and a tip at an opposite end, said temperature sensor being adjustably positioned through said first end of said bore such that said base is within said bore whereas said tip is external to said bore;

wherein said temperature sensor adjustably slides through said first end of said bore to adjust to inner dimensions of the wheel assembly as said insert portion is inserted into the wheel assembly.

13. The thermal warning device of claim 12, wherein said insert portion has a threaded outer surface for screw mounting in the wheel assembly.

14. The thermal warning device of claim 12, further comprising a distal shoulder at said first end of said bore for preventing said base of said temperature sensor from passing through said first end.

15. The thermal warning device of claim 12, further comprising a plug positioned at said second end of said bore for preventing said base of said temperature sensor from passing through said second end.

16. The thermal warning device of claim 12, further comprising a spring positioned in said bore for applying an outward axial force to said base of said temperature sensor and countering an inward axial force from said base of said temperature sensor.

17. The thermal warning device of claim 12, further comprising an electronic circuit positioned in said housing and coupled to said temperature sensor, said electronic circuit including a controller for determining whether the potential bearing failure may occur.

18. The thermal warning device of claim 17, wherein said electronic circuit includes an antenna and a transmitter for transmitting a warning signal to receivers located within a particular transmitting range.

19. The thermal warning device of claim 12, wherein:

said temperature sensor detects first temperature readings corresponding to temperatures in the wheel assembly;

said housing includes a second temperature sensor for detecting second temperature readings corresponding to temperatures outside of the wheel assembly; and said housing includes an electronic circuit coupled to said temperature sensor and said second temperature sensor for determining a rate of temperature change of said first temperature reading based on said second temperature reading.

20. The thermal warning device of claim 19, wherein said second temperature sensor is located on said electronic circuit.

21. A thermal warning device for detection of a potential bearing failure in a wheel assembly comprising:

a housing having an insert portion, a separating portion and a circuit portion;

said separating portion of said housing having a shoulder positioned adjacent to the wheel assembly and a connecting section distal from said shoulder;

said circuit portion of said housing being integrally attached to said connecting section of said separating portion, said circuit portion having a planar surface directed toward the wheel assembly that is distal from the wheel assembly at a predetermined distance; and an electronic circuit located in said circuit portion for determining whether the potential bearing failure may occur;

wherein said separating portion of said housing separates said circuit portion of said housing from the wheel assembly so that a substantial gap of thermal insulation is created between said electronic circuit and the wheel assembly.

22. The thermal warning device of claim 21, wherein said insert portion has a threaded outer surface for screw mounting in the wheel assembly.

23. The thermal warning device of claim 21, further comprising a temperature sensor supported by said insert portion and coupled to said electronic circuit, wherein said electronic circuit includes a controller for determining whether the potential bearing failure may occur.

24. The thermal warning device of claim 21, wherein said electronic circuit includes an antenna and a transmitter for transmitting a warning signal to receivers located within a particular transmitting range.

25. The thermal warning device of claim 21, wherein said electronic circuit includes a second temperature sensor.

26. The thermal warning device of claim 25, wherein:

said temperature sensor detects first temperature readings corresponding to temperatures in the wheel assembly;

said second temperature sensor detects second temperature readings corresponding to temperatures outside of the wheel assembly; and said electronic circuit determines a rate of temperature change of said first temperature reading based on said second temperature reading.

* * * * *